2,838,463
Patented June 10, 1958

2,838,463
CHLOROPRENE CEMENT HAVING IMPROVED ADHESIVE PROPERTIES

Stephen E. Freeman, Milwaukee, Wis., assignor to Freeman Chemical Corporation, a corporation of Wisconsin No Drawing. Application October 20, 1955
Serial No. 541,853

4 Claims. (Cl. 260—3.5)

This invention relates to improved cement compositions having adhesive properties.

I have discovered that homogeneous, improved cement compositions suitable for use in bonding leather and/or rubber components containing suitable quantities of: a vulcanized chloroprene (e. g., 2-chloro-1,3-butadiene) polymer such as Neoprene AC (vulcanized chloroprene polymer containing thiuram disulfide) which is manufactured by E. I. du Pont de Nemours & Co., Inc.; N-phenyl-beta-naphthylamine; zinc oxide; extra light calcined magnesia; precipitated calcium silicate such as Silene EF which is produced by Columbia-Southern Chemical Corp.; a terpene-phenolic thermoplastic resin such as Durez Resin 12603 (terpene-phenolic thermoplastic resin; oil soluble; acid No. 50 to 60; melting point 138° to 140° C. (capillary tube); specific gravity 1.085) which is produced by Durez Plastic Division, Hooker Electrochemical Co.; a paracoumarone-indene resin such as Cumar RH (paracoumarone-indene resin; melting point 77–85° C.) which is produced by Allied Chemical and Dye Corp.; chlorinated natural rubber such as Parlon (20% by weight chlorinated natural rubber in toluene; viscosity 20 centipoise at 25° C.) which is produced by Hercules Powder Co.; and, if desired, hydrated calcium silicate such as Hi-Sil which is produced by Columbia-Southern Corp. A desired amount of a solvent such as toluene may be incorporated into the cement; excellent results are obtained when the final composition contains about 30% by weight total solids.

The following compositions contain sufficient proportions of the above-identified ingredients:

CEMENT COMPOSITION NO. 1

| | Parts by weight |
|---|---|
| Neoprene AC | 100 |
| N-phenyl-beta-naphthylamine | 1.9 |
| Silene EF | 7.2 |
| Extra light calcined magnesia | 3.7 |
| Zinc oxide | 4.7 |
| Durez Resin 12603 | 36.2 |
| Cumar RH | 4.2 |
| Parlon | 8.1 |
| Toluene (solvent) | As required |

CEMENT COMPOSITION NO. 2

| | Parts by weight |
|---|---|
| Neoprene AC | 100 |
| N-phenyl-beta-naphthylamine | 1.9 |
| Silene EF | 7.2 |
| Hi-Sil | 2.5 |
| Extra light calcined magnesia | 3.7 |
| Zinc oxide | 4.7 |
| Durez Resin 12603 | 36.2 |
| Parlon | 8.1 |
| Cumar RH | 4.2 |
| Solvent— | |
| Toluene | 109.0 |
| Ethyl acetate | 196.3 |
| Methylene chloride | 274.0 |

The excellent adhesive properties of these cement compositions appears to be largely caused by the combined use of Cumar and Parlon with the Neoprene AC, N-phenyl-beta-naphthylamine, precipitated calcium silicate, light calcined magnesia, zinc oxide, and the terpene-phenolic thermoplastic resin ingredients. Thus, the presence of Cumar and Parlon in the cement composition is critical and produces an improved cement having new and unexpectedly superior results. In addition, the presence of these ingredients in the relative proportions shown in composition No. 1 and composition No. 2 significantly affect the adhesive properties of my cement.

The following examples illustrate procedures which may be employed in producing my improved, homogeneous cement compositions. The term "parts" is intended to refer to parts by weight.

Example 1

One hundred parts of Neoprene AC, 1.9 parts of N-phenyl-beta-naphthylamine, 7.2 parts of Silene EF, 3.7 parts of extra light calcined magnesia and 4.7 parts of zinc oxide may be blended or mixed in a heavy duty mechanical cement mixer. One-half of the toluene which is to be present in the final composition may be added to the mixed ingredients so that the mix may be more easily handled. 8.1 parts of Parlon, 4.2 parts of Cumar RH, and 36.2 parts of Durez Resin 12603 may then be added along with the remaining desired amount of solvent to the mix. The ingredients should then be mixed or churned until a smooth, homogeneous cement is produced. The resulting cement may be used to bond rubber to rubber, leather to leather, and rubber to leather.

Example 2

Two and five-tenths parts of Hi-Sil may be added to the mixer along with the quantities of Neoprene AC, N-phenyl-beta-naphthylamine, Silene EF, magnesia, and zinc oxide ingredients set forth in Example 1. The mix should then be blended or mixed and treated in the manner set forth in Example 1 to produce a smooth, homogeneous cement.

If desired, the Neoprene AC ingredient may be milled prior to use in the above examples; however, the use of milled Neoprene AC is not necessary.

The foregoing detailed description has been given for clearness of understanding only, and no unnecessary limitations should be understood therefrom, as modifications will be obvious to those skilled in the art.

I claim:
1. A smooth, homogeneous cement containing:
   100 parts by weight of a vulcanized chloroprene polymer
   1.9 parts by weight of N-phenyl-beta-naphthylamine
   7.2 parts by weight of precipitated calcium silicate
   3.7 parts by weight of light calcined magnesia
   4.7 parts by weight of zinc oxide
   36.2 parts by weight of a terpene-phenolic thermoplastic resin
   4.2 parts by weight of a paracoumarone-indene resin
   1.6 parts by weight of a chlorinated natural rubber
   and an inert organic solvent.

2. A smooth, homogeneous cement containing:
   100 parts by weight of a vulcanized chloroprene polymer
   1.9 parts by weight of N-phenyl-beta-naphthylamine
   7.2 parts by weight of precipitated calcium silicate
   3.7 parts by weight of light calcined magnesia
   4.7 parts by weight of zinc oxide
   36.2 parts by weight of a terpene-phenolic thermoplastic resin
   4.2 parts by weight of a paracoumarone-indene resin
   1.6 parts by weight of a chlorinated natural rubber
   2.5 parts by weight of hydrated calcium silicate
   and an inert organic solvent.

3. A smoth, homogeneous cement comprising: about 100 parts by weight of a vulcanized chloroprene polymer; about 53.7 parts by weight of a mixture of N-phenyl-beta-naphthylamine, precipitated calcium silicate, light calcined magnesia, zinc oxide, and a terpene-phenolic thermoplastic resin; about 4.2 parts by weight of a paracoumarone-indene resin; about 1.6 parts by weight of a chlorinated natural rubber; and an inert organic solvent.

4. A smooth, homogeneous cement comprising: about 100 parts by weight of a vulcanized chloroprene polymer; about 56.2 parts by weight of a mixture of N-phenyl-beta-naphthylamine, precipitated calcium silicate, light calcined magnesia, zinc oxide, a terpene-phenolic thermoplastic resin, and hydrated calcium silicate; about 4.2 parts by weight of a paracoumarone-indene resin; about 1.6 parts by weight of a chlorinated natural rubber; and an inert organic solvent.

No references cited.